United States Patent [19]

Lee

[11] Patent Number: 4,921,608
[45] Date of Patent: May 1, 1990

[54] FILTRATION APPARATUS HAVING BELTS FOR TREATING WASTE PRODUCT

[76] Inventor: Chung Yup Lee, 375-21, Daebang-Dong, Dongjak-Ku, Seoul, Rep. of Korea

[21] Appl. No.: 305,403

[22] Filed: Feb. 2, 1989

[51] Int. Cl.[5] .......................................... B01D 35/16
[52] U.S. Cl. ................................. 210/393; 210/396; 210/401; 34/112
[58] Field of Search ............... 210/401, 400, 393, 396; 34/118, 119, 112

[56] References Cited

U.S. PATENT DOCUMENTS

| | | | |
|---|---|---|---|
| 3,613,564 | 10/1971 | Adamski | 210/401 |
| 4,447,964 | 5/1984 | Gardner | 34/119 |
| 4,498,988 | 2/1985 | Fujita | 210/393 |
| 4,615,801 | 10/1986 | Lee | 210/185 |
| 4,722,793 | 2/1988 | Seifert et al. | 210/401 |
| 4,755,291 | 7/1988 | Lee | 210/179 |

FOREIGN PATENT DOCUMENTS

| | | | |
|---|---|---|---|
| 130500 | 7/1985 | Japan | 210/401 |
| 191697 | 9/1985 | Japan | 210/401 |

Primary Examiner—Bernard Nozick
Attorney, Agent, or Firm—Birch, Stewart, Kolasch & Birch

[57] ABSTRACT

An improved filtration for treating waste product which comprises a pair of filter belts, a plurality of squeezing rollers operatively connected to the filter belts, a plurality of fixed sprayers in the vicinity of the plurality of rollers for spraying hot steam, heating members for heating the rollers with hot steam, hot water, or hot air in the interior thereof, and a pair of cleaning members for cleaning and washing the belts, whereby the waste product is easily filtrated and dehydrated through the coaction between the belts and the plurality of rollers, and the belts are washed clean by the cleaning members.

5 Claims, 1 Drawing Sheet

FILTRATION APPARATUS HAVING BELTS FOR TREATING WASTE PRODUCT

BACKGROUND OF THE INVENTION

1. Field of the Invention

The present invention relates to an improved filtration and washing apparatus having belts for treating waste product. More particularly, the present invention relates to an improved filtration and washing apparatus having a pair of filter belts and a plurality of rollers which are actuated for squeezing and filtrating waste product filled in a treatment zone between the pair of filter belts to be rotated along the plurality of rollers with hot steam, hot air or hot water. And the rollers include a heating system which is actuated for heating and dehydrating the waste product in the treatment zone.

2. Prior Art of the Invention

Many types of apparatuses for filtrating and washing waste product are known in the art. It is common practice in the prior art to use vacuum filter apparatuses, centrifugal separators, roller presses, or belt apparatuses. However, since the dehydrated filth produced by prior art apparatuses contains a high degree of water, there arises the problems of fuel expense for drying and burning up the filth as well as the transportation charges. Furthermore, such roller presses or belt apparatus do not have a heating system and do not mix with hot steam or hot water so that such apparatuses cannot coagulate or solidify most of the protein in the waste product for easily filtering the coagulated protein as a residue, such as a sludge cake.

SUMMARY OF THE INVENTION

Accordingly, it is an object of the present invention to provide an improved filtration and washing apparatus having filter belts and a plurality of squeezing roller means.

Another object of the present invention is to provide a filtration and washing apparatus which is constructed for heating waste product filled in a pair of filter belts by spraying the surface of the belts with the hot steam through a plurality of nozzles of fixed sprayers whereby the efficiency of the overall filtration and waste treatment process of the apparatus are substantially improved.

A further object of the present invention is to provide a filtration and washing apparatus which is constructed for indirectly heating waste product filled in a treatment zone between the pair of filter belts by circulating the hot water, hot air, or hot steam in the interior of a plurality of squeezing roller means which connect filter belts.

Still another object of the present invention is provide an improved heating systems for use in a filtration apparatus for coagulating the most of protein and effectively dehydrating solid material in the waste product filled in a treatment zone between a pair of filter belts whereby the dehydrated filth produced by the apparatus contains a low degree of water, and there are no problems of fuel expense for drying and burning up the filth as well as the transportation charges.

Yet another object of the present invention is to provide a filtration apparatus which includes a pair of cleaning members for cleaning and washing portions of a pair of belts after the belts complete the delivery of the sludge cake.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an improved filtration apparatus having filter belts and a plurality of squeezing means for treating waste product which comprises a pair of filter belts, a plurality of squeezing rollers connected to the filter belts, a plurality of fixed sprayers in the vicinity of the plurality of roller means for spraying hot water, heating systems for heating hot steam, hot water, or hot air in the interior of the plurality of roller means, and a pair of cleaning members for cleaning and washing the belts whereby the waste product can be easily filtrated and dehydrated through the coaction between the belts and the plurality of roller means, and the belts washed clean by the cleaning members.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
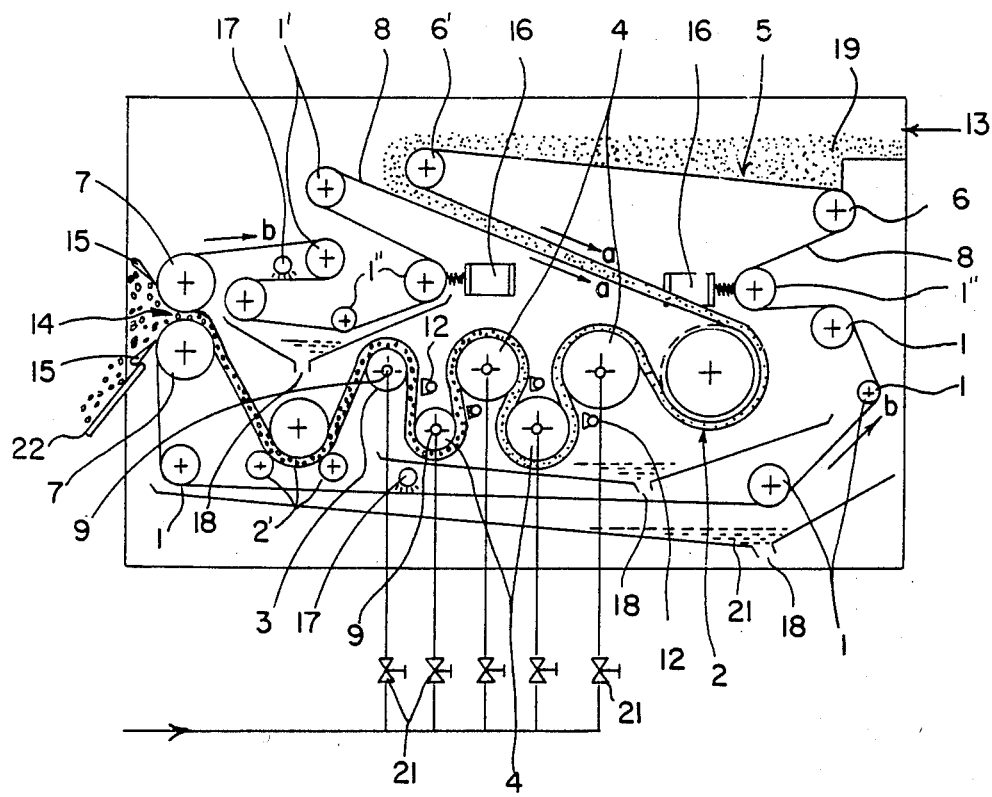
FIG. 1 is a somewhat diagrammatic side view of the filtration apparatus having filter belts of the present invention showing the construction of the apparatus of the present invention.
Figure 2:
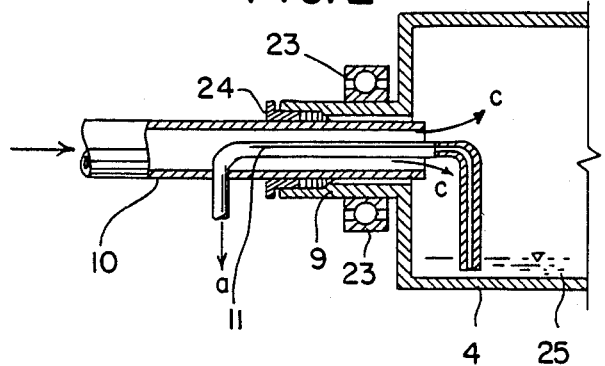
FIG. 2 is a section, enlarged view of a roller means showing the circulation of the hot water therein of the filtration apparatus of the present invention.

Referring now in detail to the drawings for the purpose of illustrating preferred embodiments of the present invention, the filtration apparatus having a pair of filter belts and a plurality of squeezing rollers as shown in FIG. 1 comprises a waste product inlet 13 and a waste product outlet 14 disposed in both end portions thereof, a plurality of hollow rollers 4 disposed in the center portion thereof, a pair of guiding rollers 6 and 6', and a pair of driving rollers 7 in the vicinity of the inlet 13 and the outlet 14, respectively, a pressured filtration roller 2 disposed between the rollers 4 and 6', a high pressured filtration hollow roller 3 disposed between the rollers 2 and 4, a plurality of squeezing rollers 2' disposed between the roller 3 and 7, and a plurality of guiding rollers 1 and 1'.

A pair of filter belts 8 are located over the rollers described above. The pair of filter belts 8 containing the waste product 19 therebetween travel along the space between the rollers 1', and 6', 2 and 4; 4 and 4; 3 and 4; 2 and 2; and 7 and 7 for the filtration of the waste product delivered from the inlet 13 in the direction indicated by arrows (a) in FIG. 1. Also, the pair of filter belts 8 pass between the rollers 7 and separate from each other so that each filter belt 8 travels around the guiding rollers 1 and 1' in the direction indicated by arrows (b) in FIG. 1. A plurality of sprayers 17 are disposed over the belts 8 are fixed for spraying water to clean the belts 8. A plurality of tension adjusting members 16 are connected to the movable rollers 1" for controlling the tension of the belts 8.

As shown in FIG. 1, the hollow rollers 3 and 4 include a hot water steam inlet tube 10 connected thereto, a U-shaped water outlet tube 11 disposed in the inlet tube 10 and communicated therewith, a tubular support 23 receiving a rotatable entrance member 9, and a retaining member 24 for preventing the entrance member 9 from separating from the inlet tube 10, respectively. The rollers 3 and 4 are provided with a fan 21 for blowing hot air into the interior thereof. The hot steam, hot air, or hot water is supplied to the interior of the hollow rollers 3 and 4, respectively, for heating the surface of the rollers around which the pair of filter belts 8 containing the waste product 19 travel for heating the waste product to coagulate or solidify protein in the waste product 19 so that the waste product can easily be filtered through the filter or the net constructed by the belts 8.

A plurality of hot water sprayers 12 located over the rollers 3 and 4 spray hot water on the pair of filter belts 8 containing the waste product 19 while the pair of filter belts 8 are rotated along the space between rollers 3 and 4, and 4 and 4.

A pair of scrapers 15 operatively contact the filter belts 8 which pass the rollers 7 for removing the sludge cake filled in the filter belts 8. The solid waste product such as the sludge cake is discharged through the waste product outlet 14 and is collected by the sludge cake container 22. Also, the liquid 21 which is filtered through the belts 8 is thereby separated from the solid waste product. The liquid is drained through draining hole 18.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A filtration apparatus having filter belts for treating waste product from surfaces of the moving belts which comprises:
   housing means,
   a pair of guiding rollers and a pair of driving rollers disposed in said housing means,
   a plurality of hollow rollers disposed along a serpentine line for closely rotating in conjunction with each other, said hollow rollers including pressured filtration rollers and a heavy pressured filtration roller for accelerating the filtration of the waste product and an entrance tube which contains an inlet tube and an U-shaped outlet tube for supplying hot water, hot steam, or hot air thereinto and discharging water therefrom,
   waste product inlet means operatively associated with said housing means for supplying waste product,
   waste product outlet means operatively associated with said housing means for discharging solid waste product,
   a pair of filter belts for containing said waste product which travel between and over said rollers for squeezing and filtrating the waste product so as to separate liquid and the solid waste product, and
   a plurality of hot water sprayers disposed over said pair of filter belts for coagulating protein in the waste product whereby the waste product is easily treated by the moving filter belts of the filtration apparatus.

2. The filtration apparatus of claim 1, a cleaning member for cleaning said filter belts are disposed adjacent to said rollers and said filter belts.

3. The filtration apparatus of claim 1, wherein a plurality of tension adjusting members are connected to movable rollers for controlling the tension of said filter belts.

4. The filtration apparatus of claim 1, wherein the waste product outlet is provided with a pair of squeezing rollers for finally squeezing and filtrating the waste product.

5. The filtration apparatus of claim 4, wherein a pair of scrapers operatively contact said filter belts for removing the solid material filled in the pair of filter belts after the belts pass along said pair of squeezing rollers and separate from each other.

* * * * *